Feb. 20, 1940.  M. B. CHAMBERS  2,191,188
ELECTROMAGNETIC BRAKE
Original Filed Dec. 20, 1937
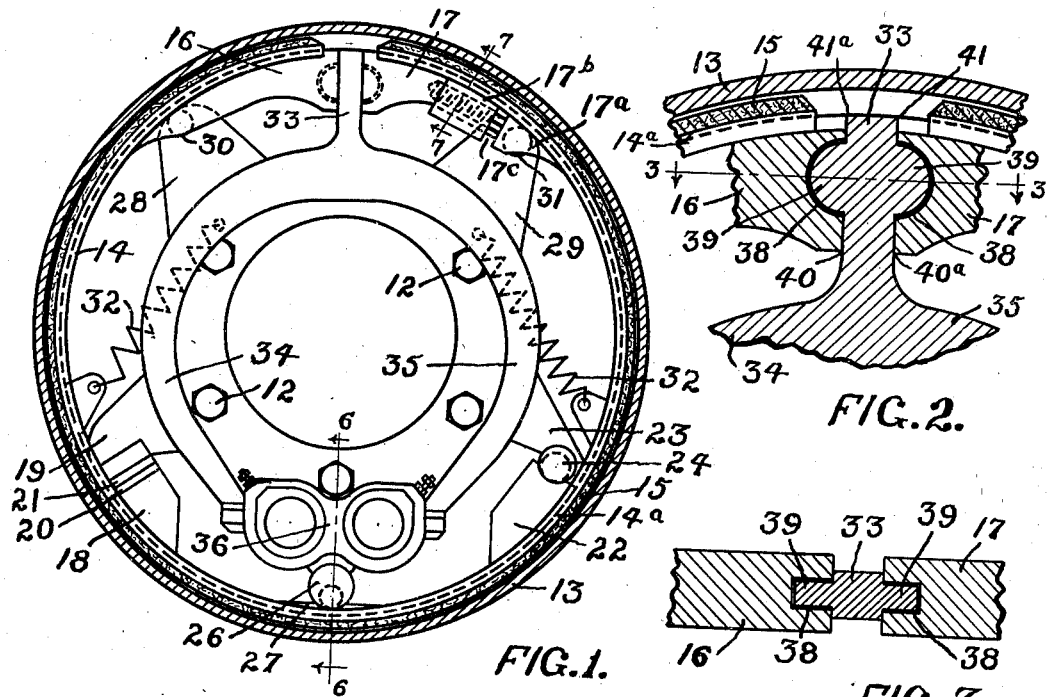
FIG.1.   FIG.2.
FIG.3.
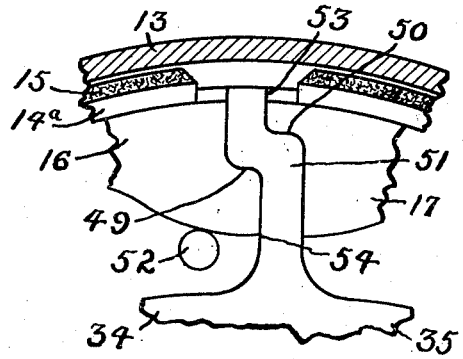
FIG.4.
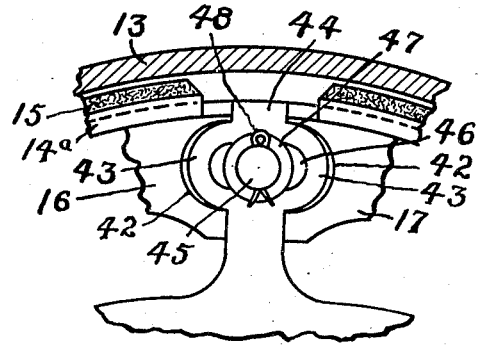
FIG.5.
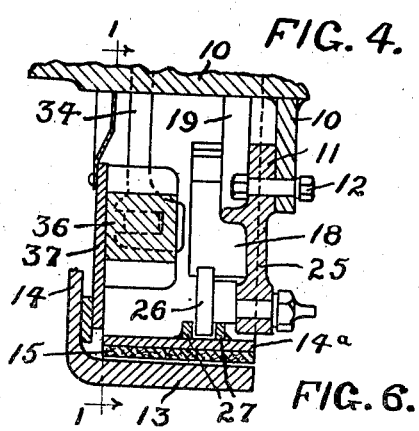
FIG.6.
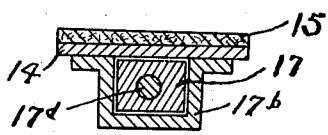
FIG.7.
INVENTOR
MORRIS BURR CHAMBERS
BY
ATTORNEY Patented Feb. 20, 1940

2,191,188

UNITED STATES PATENT OFFICE 2,191,188

ELECTROMAGNETIC BRAKE

Morris Burr Chambers, San Francisco, Calif.

Application December 20, 1937, Serial No. 180,817
Renewed June 29, 1939

7 Claims. (Cl. 188—138)

This invention relates generally to brakes and, more particularly, to electromagnetic brakes of the type disclosed in my Patent No. 2,024,847, December 17, 1935. In fact, the present invention is, in some ways, an improvement on the brake of that patent. In that brake, the cam which operates between the brake shoes is pivoted upon and turns about a pin which projects from the back plate. Necessarily, the cam swings in an arc which extends not only laterally from the central or neutral position of the cam but inwardly or away from the rim or braking flange of the brake-drum. Since, while moving in this inwardly directed arc, the cam is in contact with one or the other of the brake-shoes, it has a tendency to draw the contacted shoe inwardly and thus to move it away from the flange of the drum, thereby retarding the braking action and requiring more power to start it. One of the objects of my present invention is to eliminate, as far as is practicable, this tendency to draw the brake-shoe inwardly at the very instant that it should be moving the brakeband into contact with the drum flange.

In the accompanying drawing I have shown three specific structures for attaining the above stated and other objects. Other practicable structures therefor may be employed and I desire it to be understood that the claims hereof are not intended to be limited to the details of structure disclosed any farther than their specific terms require.

In said drawing, Fig. 1 is a view taken vertically through the brake-drum inside the wear plate for the magnet, as on line 1—1 of Fig. 6; Fig. 2 is a vertical sectional view through the brake-shoes and the upper part of the magnet lever, showing the structure at the upper part of Fig. 1; Fig. 3 is a section on line 3—3 of Fig. 2; Fig. 4 is a side elevation of a modified form of brake shoes and magnet lever; Fig. 5 is a view similar to Fig. 4 but showing another modification; Fig. 6 is a vertical section through the lower part of the brake-drum, as on line 6—6 of Fig. 1, and Fig. 7 is a section on line 7—7 of Fig. 1.

Referring first to Fig. 6, 10 represents a portion of the axle structure of a vehicle to which my invention is applied. Bolted, or otherwise secured to said axle structure is a back member 11, corresponding to the usual back-plate of the brake drum. In the present case, however, this member is in the form of a spider, having a ring-like portion through which bolts 12 are passed to secure it to the axle structure. The ring-like portion of the member 11 is provided with a plurality of radially extending arms, the structure and purposes of which will presently be set forth. This spider affords spaces or openings between the arms for ventilation. When applied to relatively light vehicles, the operation of the brake does not result in the generation of great heat, and a continuous plate or disk can be used. But if it be applied to a heavy vehicle, particularly one with a heavy trailer attached to it, the heat generated by the brake becomes very great and ventilation is desirable. The drawing shows the brake adapted for this heavy duty.

Surrounding the spider 11, and partially housing it, is the braking flange 13 of the brake drum, the vertical web of the drum being indicated, in part, at 14. This web is attached to the wheel to be braked, as is well understood. Within the braking flange 13 is the brake band 14a and its lining 15. The band is split at the top of the drum, and to its ends are applied brake-shoes 16 and 17. As shown, the shoe 16 is attached rigidly and directly to the respective end of the band, while the shoe 17 is adjustably attached to the other end and is adapted for limited movement on the band as the brake lining wears. Various structures could be used to effect this adjustment. That shown comprises members 17a and 17b which are fixed to the band with a space 17c between them. The member 17b is in the form of a tubular sleeve into which extends and slidingly fits a projection on the shoe 17. This projection has a threaded socket open at the end toward the member 17a for an adjusting screw or bolt 17d, the latter having a suitably shaped wrench-engaging enlargement in the space 17c. By turning the screw or bolt 17d, the shoe 17 is moved with respect to the brake band and wear is thus taken up. A similar adjusting device may, if desired, be employed for the shoe 16. It is assumed that, when the vehicle is moving forwardly, the wheel and brake drum turn toward the right, or clockwise, as viewed in Fig. 1. To brake the drum when it is turning in that direction, the brake-shoe 17 is moved to the right, whereupon the right-hand part of the band lining is gripped by the drum flange and the drum is brought to rest. At the same time, the shoe 16 is but lightly applied and there is little wear of the brake lining at that end of the brake. When the wheel and drum are turning backwardly, it is the shoe 16 which is operated in braking and it is the lining at and to the left of that shoe that is subjected to wear. However, the vehicle is moving backwardly so little of the time that this wear is almost negligible. For that reason, the shoe 16 is not adjustably mounted on the band, although it obviously may be so mounted if desired.

As shown, the brake band is anchored at two separated points. One of the anchors is shown at 18. It is rigidly attached to the band 14a and is adapted to engage an arm 19 on the back member or spider 11. Hardened members 20 and 21 are preferably positioned on the anchor and arm, respectively, to make contact and avoid wear. When the wheel and drum are turning forwardly and the shoe 17 is operated, the band lining between that shoe and the anchor 18 will seize the drum flange and be active in braking. Preferably about 240° of the band or lining is thus seized. The other anchor is shown at 22. It, too, is rigidly attached to the band 14a and is adapted to act against another arm 23 on the spider 11. This arm, however, has an eccentrically mounted contact pin 24 which is positioned for engagement with an arcuate surface formed in the anchor 22. By turning the contact pin more or less in one direction or the other, the anchor 22 and the band is moved toward or from the brake flange 13 to take up wear of the lining. Preferably the point of anchorage at 22 is 240° from the end of shoe 16. At its lower part, the spider has another arm, 25 (see Fig. 6), which carries an eccentrically mounted disk 26 for engagement with the band 14a, thus to take up wear of the brake-band lining at that point. The perimeter of this disk extends between a pair of ribs 27 on the band to hold the latter against possible lateral movement. Arms 28 and 29, which project upwardly from the ring-like portion 11 of the spider, have pins 30 and 31, respectively, for holding the band 14 outwardly at its upper ends. Springs 32, which are attached to the spider 11 and to the band 14a near the arms 19 and 23 return the band to its normal or unbraking position after operation.

The brake shoes are moved by a relatively short finger or member 33 which projects upwardly between them. This finger is part of an operating lever which has a pair of arms 34 and 35 that extend in opposite direction from the finger and curve about the axis of the drum, their lower ends approaching each other to support an electromagnet 36. As best seen in Fig. 6, this magnet faces an armature ring or plate 37 which is rigidly mounted on the inner side of the drum web 14 and, of course, rotates with it. This part of the invention is very nearly the same as is shown and described in my said Patent No. 2,024,847 and its operation is the same, so that it is deemed unnecessary to enter into a more detailed description herein. Means, fully disclosed in said patent, are provided for supplying current to the magnet 36 when the brake is to be operated. Upon energization of said magnet, the rotating armature plate is seized magnetically and the magnet is swung to the left or right, as the case may be. In so swinging, the lever which carries the magnet is also swung and the finger 33 is caused to push one or the other of the brake shoes away from its normal position and thus set the brake at that end of the band to which the displaced shoe is attached.

The salient feature of my present invention resides in the means for supporting the magnet lever and the finger 33 thereof. In my former patent, this support comprised a pivot pin which was projected inwardly from the back plate. There was but one objection to that structure and it was not serious. However, it was what led me to my present invention. When the lever of the patent is swung, the cam between the brake shoes moves in an arc about the said pivot pin. The highest point of this arc is at the top of the drum at the center of the cam. On both sides of this point, the arc bends inwardly about the pivot pin. Consequently, while the cam swings to either side to push the respective brake shoe to the right or left it also tends to move the shoe away from the drum flange. This objection has now been overcome by the elimination of the pin as a pivotal support and by supporting the lever on the brake shoes themselves.

Taking up the structure which is illustrated in Figs. 1, 2 and 3, the facing ends of the shoes are each provided with a recess 38 and the finger 33 with a pair of oppositely positioned lugs 39 which extend into the respective recesses, as best seen in Figs. 2 and 3. In assembling, the band 14 is sprung open, the finger is inserted between its ends, and the band is then permitted to close upon the finger. The lugs 39 are caught within the recesses and cannot escape from them when the brake band is assembled within the drum. Therefore, the finger, the lever and the electromagnet are suspended from the brake shoes. As shown, the bottoms of the recesses are preferably arcuate and the lugs are rounded to fit them more or less snugly. The shoes at the sides of the recesses hold the finger and lever from lateral movement, as will be understood.

When the magnet 36 moves to the left in Fig. 1, the outer end of the finger 33 moves to the right and pushes the shoe 17 in that direction. In so doing, the finger fulcrums against the shoe 16 at point 40. Pressure at that point moves the shoe 16 backwardly and also upwardly. The fulcrum point is not fixed but yields in an outward direction. This tendency to yield outwardly is contributed to by the resistance of shoe 17 to upward movement since it is held outwardly by the guide lug 31 on the arm 29. As the outer end of the finger moves to the right, therefore, the fulcrum point 40 moves outwardly with the result that the point 41 of contact with the shoe 17 moves almost horizontally and pushes shoe 17 to the right without moving it away from the drum flange. If and when the finger 33 be moved in the opposite direction, it fulcrums at the point 40a and presses against shoe 16 at the point 41a. It will thus be seen that the lever 34—35 has no fixed pivot but floats with the movements of the brake shoes.

In Fig. 5 I have shown a structure like that of Fig. 2 except that the recesses 42 in the faces of the shoes extend entirely across said faces, and the lugs 43 are as thick as the finger. In such structure it would be possible for the finger 44 to move laterally. To prevent lateral movement thereof, I extend a pin 45 forwardly, preferably from the spider ring 11, through an elongated slot 46 in the finger and lugs 43 and apply a washer 47 and cotter pin 48. The finger 44 floats with the brake shoes, as in Fig. 3 and moves with respect to the pin 45. But the pin does not at any time contact with the ends of the slot or form a pivot for the lever and finger, its only function being to hold the finger from lateral movement. As shown, the slot 46 is preferably somewhat wider than the diameter of the pin 45 in order that there may be no binding or friction between the pin and the walls of the slot when the operating lever is swung in either direction.

In the structure shown in Fig. 4, the face of one of the shoes (16, as shown), is cut away at its upper part to form a shoulder 49. The other shoe (17, as shown), is similarly cut away at the lower part of its face to form a shoulder 50. The finger 51 on the lever 34—35 has a Z-shaped bend to fit against the said shoulders. The horizontal part of the bend rests upon the shoulder 49 and the lever is supported by that shoulder. That is to say, the weight of the lever and the magnet is carried by the shoulder on the one shoe 16. To prevent the shoe from sagging due to the weight, a pin or lug 52 is projected from a stationary part of the structure and the shoe 16 rests on it. The action of the finger 51 upon the brake shoes is similar to that of fingers 33 and 44 and need not be described in detail further than to point out that the bearing point 53 on the shoe 17 is substantially above the fulcrum point 54 on the shoe 16. When the finger turns to the right about this fulcrum the point 53 moves almost horizontally and there is substantially no tendency to move the shoe 17 away from the drum flange.

Having described my invention, I claim:

1. In an electromagnetic brake, a rotatable drum having a braking surface, a non-rotatable member, a split brake-band anchored intermediate its ends to said member and adapted to be brought into contact with said braking surface, a shoe for and attached to each end of said band, the shoes facing each other at their adjacent ends and each of said facing ends being provided with a recess, a lever mounted for rocking movement within the brake-drum and having a finger projecting between the facing ends of said shoes, a pair of lugs on the opposite faces of said finger, said lugs extending into the respective recesses in the brake shoes when the brake is assembled, whereby the lever is supported from the said shoes, an electromagnet mounted on said lever and an armature turning with the drum and positioned for magnetic engagement by the electromagnet when the latter is energized, for the purpose specified.

2. An electromagnetic brake as set forth in claim 1 in which the drum is provided with a flange and in which the braking surface is the interior surface of said flange.

3. An electromagnetic brake as set forth in claim 1 in which the recesses in the facing ends of the brake shoes are closed at their sides to provide means for engaging the sides of the lugs on the finger, thus to hold the finger and the magnet lever from sidewise movement.

4. An electromagnetic brake as set forth in claim 1 in which the bottoms of the recesses in the brake shoes are rounded and the lugs on said finger are correspondingly rounded to fit within the said recesses.

5. An electromagnetic brake as set forth in claim 1 having means for adjusting one of the shoes with respect to the brake-band to take up wear.

6. A brake comprising a rotatable drum having an inner braking surface, a nonrotatable member, a split brake-band having an outer lining anchored intermediate its ends to said member and extending about within said drum in proximity to the braking surface thereof, a brake shoe for and attached to each end of the band, said shoes facing each other at their adjacent ends, the facing end of one of said shoes being notched inwardly from its outer edge and the facing end of the other shoe being notched outwardly from its inner edge so that a Z-shaped space is provided between said faces when the shoes are separated, an operating lever having a Z-shaped finger thereon, said finger being adapted to fit within the said Z-shaped space, and manually-controlled means for swinging said lever to cause the finger thereon to move one of the said shoes thus to cause the brake-band lining to engage the said inner braking surface.

7. A brake as set forth in claim 6 in which a stationary member is provided below that shoe which has the notch extending inwardly, said member being adapted to prevent the brake-band from sagging under the weight of the lever.

MORRIS BURR CHAMBERS.